J. B. Smith,
Making Clothes Pins.

N° 85,338.  Patented Dec. 29, 1868.

Witnesses
Baltis D. Long
John J. Chew

Inventor:
John B. Smith
by his atty
S. S. Fahnestock

J. B. Smith,
Making Clothes Pins.

Nº 85,338. Patented Dec. 29, 1868.

Witnesses.
Inventor.

J. B. Smith,
Making Clothes Pins.
N° 85,338. Patented Dec. 29, 1868.
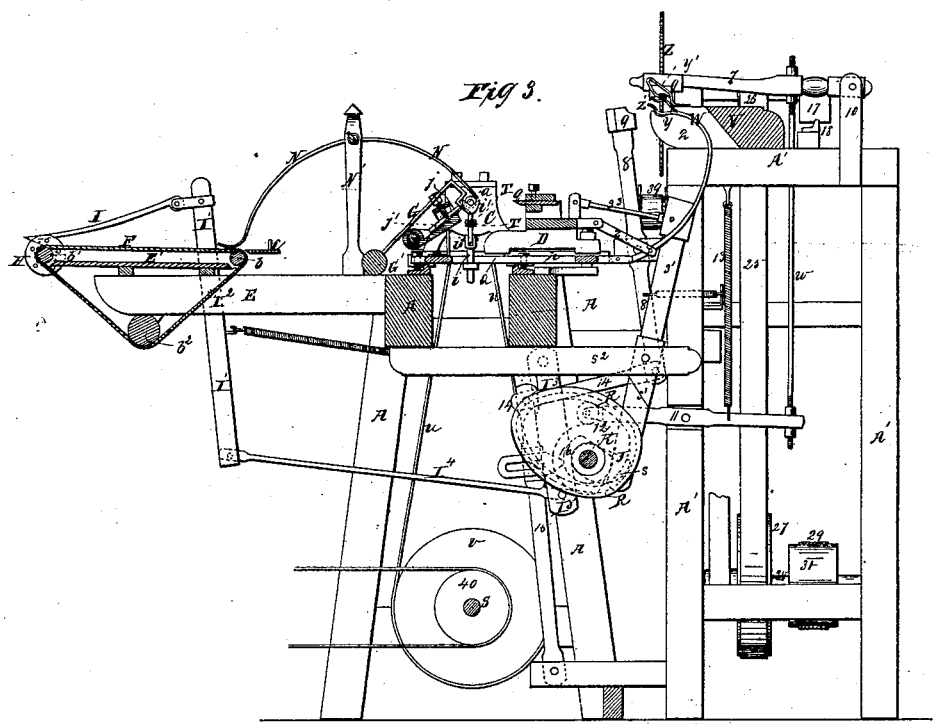
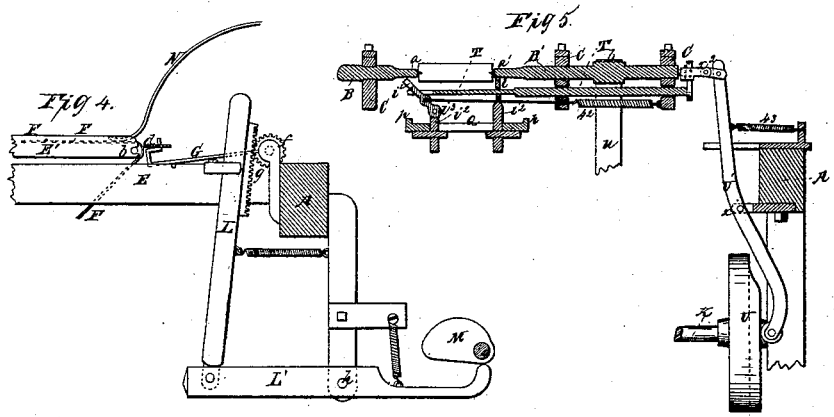
Witnesses.
Baltis D. Long.
John J. Chew
Inventor.
John B. Smith
by his atty
S. S. Fahnestock

UNITED STATES PATENT OFFICE.

JOHN B. SMITH, OF SUNAPEE, NEW HAMPSHIRE.

Letters Patent No. 85,338, dated December 29, 1868.

IMPROVEMENT IN MACHINE FOR MAKING CLOTHES-PINS.

The Schedule referred to in these Letters Patent and making part of the same.

*To all whom it may concern:*

Be it known that I, JOHN B. SMITH, of Sunapee, in the county of Sullivan, and State of New Hampshire, have invented a new and useful Automatic Machine for Making Headed and Slitted Clothes-Pins; and I do hereby declare that the following is a full, clear, and exact description of the construction and operation thereof, reference being had to the accompanying drawings of the same, which make part of this specification, and in which—

Figure 3 represents a vertical cross-section, taken at the line $o\ o$ of fig. 1;

Figure 4 represents a sectional view of the mechanism for operating the arms for receiving and depositing the blanks between the clamping-centres;

Figure 5 represents a sectional view of the centres and the seats for receiving the blanks from the depositing-arms;

Figure 6 represents the pin-blank;

Figure 1:
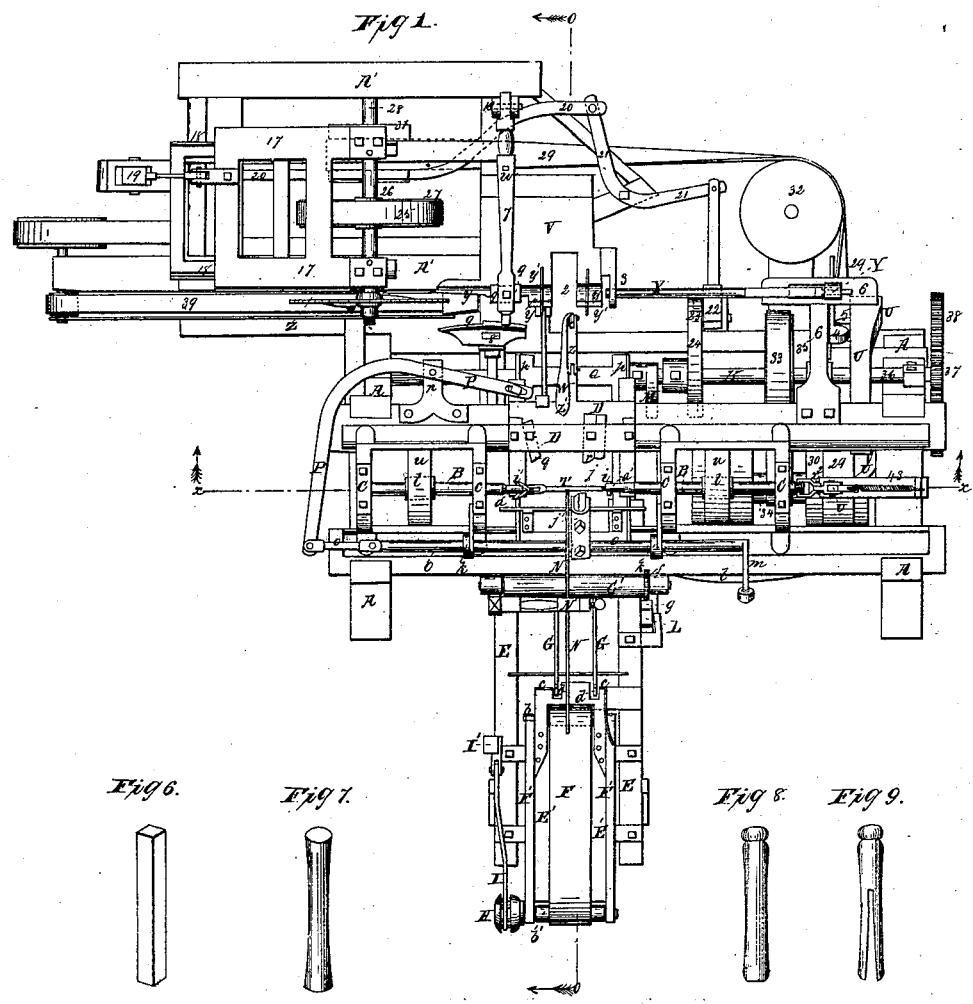
Figure 1 represents a plan or top view of a machine embracing my improvements.
Figure 2:
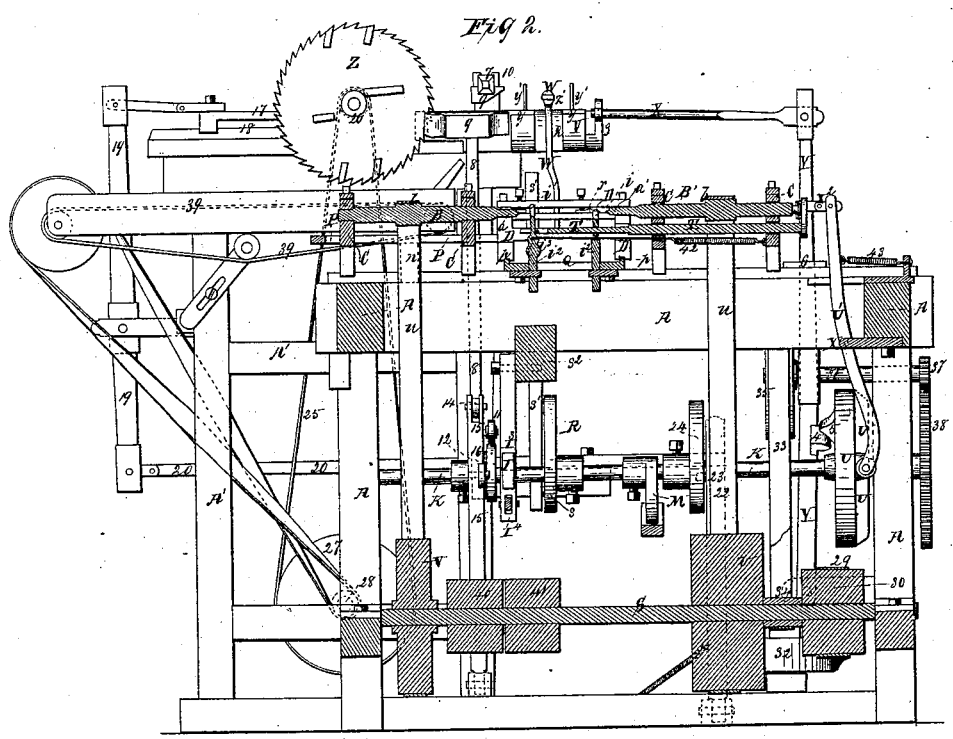
Figure 2 represents a vertical section of the machine, taken at the line $x\ x$ of fig. 1.

Figure 7, the pin as shaped by the gouge;

Figure 8, the pin as shaped by the heading and pointing-cutters; and

Figure 9, the slitted and finished pin.

My invention relates to certain devices, herein specifically described, whereby a square billet of wood, of the proper length, is carried to the cutters, turned, headed, and slotted, by successive and regular automatic movements, and delivered from the machine a finished clothes-pin.

In the accompanying drawings, A A' represent the frame upon which the several parts of the mechanism are arranged and supported.

This frame consists of two parts, upon one of which, A, the receiving and turning-mechanism is mounted, and upon the other, A', the slitting and delivering-mechanism is arranged.

The journals B B' of the centres $a\ a'$ are supported upon the front frame, A, by standards C, arranged so as to leave a suitable space between the centres $a$ for the movement of a cutter-carriage, D.

The cutter-carriage is arranged on one side of the centres, and the receiving-mechanism of the pin-blanks on the opposite side of the centres, and projects frontward from the frame, directly in a line transversely with the cutter-carriage.

The receiving-mechanism consists of a horizontal frame, E, upon which a platform, E', is placed, having a roller, $b\ b^1$, fitted in each end, around which, and a roller, $b^2$, beneath the frame, an endless apron, F, passes, so that the portion above the platform is horizontal, and upon which the pin-blanks are placed crosswise, in a row, and fed, one by one, to the receiving and depositing-arms.

The platform has parallel sides, F', for the purpose of holding the pin-blanks evenly upon the feeding-apron.

The inner end of the platform E' is notched, and has a lip, $c$, turned up, against which the pin-blank is fed and arrested.

Between this end of the platform and the front side of the frame two receiving and depositing-arms, G, are placed, so that their front ends fit within the notches of the platform, while their opposite ends are secured to a head-piece, G', fitted in bearings, so that the front ends of the arms G may move in the arc of a circle, to carry the pin-blank to the centres.

The front ends of these arms G are bent, so as to form seats, $d\ d$, and fit within the notches, and receive the pin-blank as it is fed from the apron F.

One end of the outer roller $b^1$ carries a ratchet-wheel, H, into which fits a ratchet-pawl, I, hinged to the upper end of an arm, I$^1$, pivoted at I$^2$, and whose lower end is connected to a pendent hinged arm, I$^3$, by means of a rod, I$^4$, the hinged pendent arm I$^3$ being located so as to receive the action of a cam, J, on the cam-shaft K, which vibrates the pivoted arm I$^1$, and thus communicates an intermittent motion to the ratchet-pawl I and endless feeding-apron.

The head-piece G' of the lifting-arms G has a pinion, $f$, at one end, into which match the cogs of a rack, $g$, on the upper end of an upright arm, L, whose lower end is hinged to the front end of a horizontal arm, L', pivoted at $h$, and whose inner end extends to and is operated by a cam, M, on the cam-shaft K, in such manner as to give an intermittent vertical motion to the rack $g$, to operate the lifting-arms G.

In delivering the pin-blank, the arms G receive it from the endless apron F, and, rising through about a quarter of a circle, carry it over, and deliver it upon seats $i\ i^1$, arranged directly beneath the centres, in the same vertical plane with their axes; and, in order to hold the pin-blank while being carried over to the centres, I secure a spring-wire guide, N, to a post, N', above the arms G, so as to extend from the inner end of the feeding-apron F to just above the centres in the arc of a circle, whose centre is the axis of the bearings of the lifting-arms, so that the arms, with the pin-blank, will sweep beneath the spring-guide N in such close proximity as to hold the pin-blank upon its seats on the ends of the arms G while being carried over to the cutters.

The gouge $j$, for cutting and shaping the body of the pin, is located between the centres and the axis of the lifting-arms. It is clamped in a stock or arm, $j'$, secured to a horizontal carrying-rod, O, fitted in bearings, $k$, on the frame A, parallel to the axis of the centres, and has a traversing and slightly-oscillating motion to and from the centres.

The gouge and stock extend upward from the supporting-rod O in an inclined position, and its traversing motion is produced and regulated by the motion of the cutter-carriage D on the opposite side of the centres, while its oscillating motion is just sufficient to give shape to the body of the pin, and is produced and governed by a fixed guide, $l$, secured to the side of the frame A, and which is the exact contour of the body of the pin, as shown in fig. 7; and the oscillation of the gouge is governed by this guide by means of an arm, $m$, extending from the right end of the traversing-rod O, as shown in fig. 1, so as to hold the cutter to the pin, and shape its sides.

The traversing motion of the gouge parallel to the axis of the centres is effected by the traversing motion of the cutter-carriage D, at right angles to the axis of the centres, by means of a right-angled arm, P, pivoted to a bracket, $n$, on the top of the frame A, having its front end hinged to the left end of the traversing-rod O, by means of an intermediate link, $o$, and its opposite end pivoted to the rear side of the transverse cutter-carriage.

This transverse cutter-carriage D is mounted upon ways, $p$, secured to a bed-plate, Q, on the frame A, so that the carriage may approach and recede from the centres. It carries two cutters, one, $q$, to shape the end of the pin to be slitted, and the other, $r$, to form the head of the pin.

These cutters are adjusted and clamped between horizontal bars at the top of the carriage, so that their cutting-edges are on a level with the axis of the centres.

The motion of this transverse carriage D is derived from a grooved cam, R, on the cam-shaft K, into which groove fits a wrist-pin, $s$, on the lower end of the lever $s^1$, pivoted, at the middle of its length, to an arm, $s^2$, of the frame, while the upper end of this lever $s^1$ is connected to said carriage by a coupling-arm, $s^3$.

As the groove of the cam R, therefore, vibrates the lever $s^1$, it should be such as to cause the carriage to approach and recede from the centres at the proper time, and with the proper motion.

The journals B B' of the centres are provided with small pulleys, $t$, around which bands $u$ pass to larger pulleys, $v$, on the driving-shaft S, secured, in bearings, to the lower portion of the frame, and from which the centres receive their revolving motion.

The right centre, in addition to its revolving motion, has also an axial motion, for the purpose of clamping the pin-blank between the centres, so that the distance between the centres must be greater than the length of the blank.

In order, therefore, to support the pin-blank in a line coincident with the centres, after it is deposited by the arms, and before it is clamped by the centres, I arrange two supports or seats, $i\ i^1$, directly beneath the centres, and in a vertical plane with the axes thereof, so arranged that they will be within the points of the centres, to receive and support the pin-blank in a horizontal line therewith.

These seats $i\ i^1$ are formed of V-shaped notches in the upper ends of short standards, $i^2$, secured to the bed-plate Q, upon which the transverse carriage moves.

One of these notched seats $i$ is fixed, and the other movable.

The movable seat $i^1$ is connected, by a hinged joint, $i^3$, to its standard $i^2$, and this movable seat is connected to a horizontal piston-rod, T, to be presently described.

It will be observed that the seats are placed within the ends of the centres, and, in this position, they would interfere with the turning of the pin-blank. To avoid this, however, the right-centre journal B' has an axial movement, and, when forced inward against the end of the pin-blank, the latter is forced out of the fixed seat $i$, and the right centre passes over the same, so as to hold that end of the pin-blank clear of its seat $i$, as shown in fig. 5, Sheet No. 3 of the drawings.

This axial motion of the centre B' is produced by a cam, U, on the right end of the cam-shaft K, which vibrates a lever, U', pivoted, at $x$, to the frame A, and whose upper end is connected to the right end of the journal B' by a link, $x^2$, which fits into a neck on the end of said journal, so as to permit it to revolve, while the vibration of the lever is such as to move the centre inward, to clamp the pin-blank when deposited upon the seats, and to withdraw it therefrom by a spring, 43, and release the pin, when turned.

Simultaneously with the removal of the pin-blank from the fixed seat, the movable seat $i^1$ is also released from the pin-blank, and shoved beneath the left centre, out of the way. This is effected by the piston-rod T, to one end of which it is connected, while its outer end is connected to the right end of the journal B', so that the movement of said journal also moves the piston-rod, and the pin-blank is, therefore, released from the seats at both ends at once, and clamped, to be turned, and released and reseated, to be removed after being turned.

The jointed seat $i^1$ moves back and forth with the axial movement of the right centre, or it may be brought back by a spring, 42.

The pin, being now turned to the proper form, headed, and pointed, requires only to be slotted to finish it. This is accomplished by the mechanism arranged upon the frame A', which is located at the rear and left of the frame A.

Directly in the rear of the transverse cutter-carriage, and upon the top of the frame A', I arrange a bed-piece, V, in the front edge of which I arrange a seat, $y$, into which the turned pin is deposited.

The mechanism for effecting this consists of a curved arm or goose-neck, W, hinged to the fixed bed-plates Q of the transverse carriage D, and connected to the transverse cutter-carriage by means of a link, $z$, immediately above said hinged joint of the arm W, while the upper end of this curved arm has a spring-mouth or hand-shaped end, $z'$, for the purpose of grasping the turned pin while resting upon the seats $i\ i'$, and just as the reciprocating journal retires from the pin, and carries it over to the seat $y$, to be slotted.

The motion of this seizing and delivering curved arm W is effected and regulated by the motion of the transverse cutter-carriage D, and the curve of the arm or goose-neck is such that its spring-mouthed end will descend and seized the turned pin, and carry it up and over to the seat $y$, its end passing into an opening, 2, in the bed-piece V for that purpose.

The motion of the transverse cutter-carriage towards the centres causes the arm to move down, and seize the turned pin, and the receding motion of said carriage causes the arm to rise until its end, within which is grasped the turned pin, is coincident with the groove or seat $y$ of the saw-frame.

In order to release the pin from the grasp of the spring-mouth of the goose-neck, I arrange upon the bed-piece V, immediately above the seat $y$, two spring-holders, $y'\ y'$, which extend over the seat, so as to bear slightly upon the pin as it is drawn into the seat beneath the spring-holders, and hold it there, until it is pushed therefrom, between two clamping-levers, by means of a piston-rod, X, arranged at the right end of the frame A', in the line of the seat, so that its end will abut against the end of the seated pin.

The acting end of the piston-rod is supported and guided by means of a bracket, 3, on the end of the bed-piece, while the other end is connected, by a joint, to an upright arm, Y, hinged to the frame A near its base, and which carries an adjustable cam-arm, 4, arranged so as to receive the action of a cam, 5, on the inner side of the cam U of the cam-shaft.

The upright arm Y is steadied in the movement by a bracket, 6, from the main frame.

The slotting-saw Z is arranged upon the top of the rear frame, with its cutting-teeth directly in a line with the seated pin, while the clamps for holding the pin are arranged between the seat $y$ and the saw.

These clamping-levers are arranged at right angles to each other, one, 7, being horizontal, and the other, 8, vertical; and their contiguous ends are provided with jaws, 9, curved to correspond with the sides of the pin, so that, when the pin is pushed inward to the saw, the upper jaw comes down, and clamps the pin upon its seat, while the vertical jaw moves forward, and clamps the side of the pin, forming, as it were, a continuation of the seat $y$.

The horizontal clamping-lever is hinged to a vertical stud, 10, on the top of the frame A′, and is operated, so as to clamp and release the pin, by means of a lever, 11, pivoted to the frame A′, one end being connected to the clamping-lever by a rod, $w$, and the other extending above the cam-shaft, to receive the lifting-action of a cam, 12, which depresses the upper jaw, while a spring, 13, constantly tends to elevate it. Thus, when the cam is not acting, the jaw is held up by the spring.

The vertical lever 8 is hinged, at the middle of its length, to the rear frame, and is connected, at its lower end, to a horizontal link, 14, which, in turn, is connected to the upper end of an arm, 15, hinged to the base of the frame, so as to receive the action of a cam, 16, on the cam-shaft, so as to force, at proper intervals, the upper end of the hinged arm 15, and the lower end of the vertical lever 8, outward, and consequently forces the horizontally-moving jaw inward against the pin.

The two jaws thus arranged and operated act simultaneously, to clamp and release the pin.

The slotting-saw Z is mounted, in suitable bearings, upon a cast-iron frame, 17, and has a horizontal-traversing movement upon ways, 18, on the top of the frame A′, for the purpose of feeding the saw while slitting the pin.

This traversing movement is effected by means of a rear vertical lever, 19, hinged to the frame, and connected, by a link, to the saw-frame, and, at its lower end, to a horizontal rod, 20, which, in turn, is connected to a pivoted bell-crank, 21, having a connection with an upright hinged arm, 22, whose upper end is connected, by a pin, 23, to a grooved cam, 24, on the cam-shaft.

The cam is of such form as to operate the several connecting-rods, so as to cause the saw to approach, slot, and recede from the slotted pin, at the proper time, and with the proper motion.

The saw has cutters on each side, for widening and smoothing the slot of the pin.

The saw derives its motion from a band, 25, passing round a small pulley, 26, on the saw-shaft, and leading to a larger pulley, 27, on the shaft 28, in the lower part of the frame.

The shaft 28 derives its motion from a band, 29, leading from a pulley, 30, on the driving-shaft, to a pulley, 31, on said shaft 28.

This band 29 has the form of an L, by means of two intermediate pulleys, 32, on a vertical spindle, as shown in fig. 1 of the drawings.

The cam-shaft K derives its motion from a band, 33, leading from a pulley, 34, on the driving-shaft, to a pulley, 35, on a short shaft, 36, at the rear side of the main frame, said shaft carrying a pinion, 37, on its outer end, which engages with a cog-wheel, 38, on the end of the cam-shaft.

An endless delivering-apron, 39, is arranged beneath the saw, so as to receive and deliver the finished pins, which drop, of their own weight, upon said apron, after being slotted and released from the jaws. It is driven by a crossed band from the shaft 28.

The driving-shaft is provided with fast and loose pulleys, 40 and 41, round which the band passes from the engine, to drive the machine.

Having described the operation of the several parts, in connection with their construction, it is deemed unnecessary to give any further description of the operation of the machine.

The form and construction of the several cams for effecting the several automatic motions of the machine are shown in the drawings, and their proper adjustment and duration of action will readily suggest themselves to those skilled in the art. A detailed description, therefore, of the form of these cams, and of their time and duration of action, is not deemed necessary.

Instead of the clamping-levers, for holding the pin to the saw to be slotted, a turning-table or plate may be used for that purpose.

What I claim, is—

1. The lifting and depositing-arms G, constructed and operated substantially as described, to carry the blanks to and deposit the same upon the seats or pin-rests $i$ $i'$, to be clamped by the turning-centres.

2. The combination of the lifting and depositing-arms G with the curved spring-guide N, for holding the pin-blank to the arms while being carried over to the turning-centres, substantially as described.

3. The fixed and movable seats or pin-rests $i$ $i'$, with the turning-centres, operating substantially as described.

4. The grasping and carrying-arm or goose-neck W, constructed and operated substantially as described, to carry the turned pin from the seats or pin-rests $i$ $i'$ to the seat $y$, to be slotted.

5. The combination of the seat $y$ and the releasing-springs $y$ $y'$, and their arrangement, in reference to the carrying-arm W, the pushing-arm X, and the clamping-jaws $q$ $q$, substantially as shown and described.

6. In combination with the seat $y$ and spring-holders $y'$ $y'$, the piston-rod X, operating substantially as described.

7. The clamping-levers 7 and 8, or their equivalent, in combination with the seat $y$, the piston-rod X, and the slotting-saw Z, operating substantially as described.

8. The transverse traversing cutter-carriage D, connected with and operating the longitudinally-reciprocating cutter-gouge, substantially as described.

9. The transverse cutter-carriage D, connected with and operating the seizing and carrying-arm or goose-neck W, substantially as described.

JOHN B. SMITH.

Witnesses:
CUMMINS C. WINTER,
CARLOOS GAILL.